(12) United States Patent
Matsumoto et al.

(10) Patent No.: US 7,348,387 B2
(45) Date of Patent: Mar. 25, 2008

(54) THERMOPLASTIC POLYMER, PROCESS FOR PRODUCING THE SAME, AND MOLDED ARTICLE

(75) Inventors: Hideki Matsumoto, Nagoya (JP); Akiko Tanaka, Nagoay (JP); Daisuke Yamamoto, Nagoya (JP); Daisuke Sato, Yonezawa (JP); Toru Yamanaka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 296 days.

(21) Appl. No.: 10/947,536

(22) Filed: Sep. 23, 2004

(65) Prior Publication Data

US 2005/0119418 A1 Jun. 2, 2005

Related U.S. Application Data

(63) Continuation-in-part of application No. PCT/JP03/03608, filed on Mar. 25, 2003.

(30) Foreign Application Priority Data

| Mar. 26, 2002 | (JP) | 2002-085345 |
| May 31, 2002 | (JP) | 2002-160806 |
| Jun. 13, 2002 | (JP) | 2002-172183 |

(51) Int. Cl.
*C08F 34/02* (2006.01)

(52) U.S. Cl. ........... 526/266; 526/317.1; 526/318.4; 526/328.5; 526/329.6

(58) Field of Classification Search ........... 526/266, 526/269, 317.1, 318.4, 328.5, 329.6
See application file for complete search history.

(56) References Cited

U.S. PATENT DOCUMENTS

| 4,789,709 A | 12/1988 | Kato et al. ........... 525/366 |
| 4,874,824 A | 10/1989 | Hallden-Abberton et al. ..... 525/379 |
| 4,965,321 A | 10/1990 | Yuyama et al. ........... 525/329.7 |
| 5,198,305 A | 3/1993 | Wada et al. ........... 428/463 |

FOREIGN PATENT DOCUMENTS

| EP | 0 264 508 A1 | 4/1988 |
| EP | 0 273 397 A2 | 7/1988 |
| EP | 0 537 767 A1 * | 4/1993 |
| GB | 1 437 176 | 5/1976 |
| JP | 49-85184 A | 8/1974 |
| JP | 58-217501 A | 12/1983 |
| JP | 60-20905 A | 2/1985 |
| JP | 60-120707 A | 6/1985 |
| JP | 60-120735 A | 6/1985 |
| JP | 60-136791 A | 7/1985 |
| JP | 61-271343 A | 12/1986 |
| JP | 62-41973 B2 | 9/1987 |
| JP | 1-103612 A | 4/1989 |
| JP | 1-279911 A | 11/1989 |
| JP | 5-105797 A | 4/1993 |
| JP | 8-301931 A * | 11/1996 |
| JP | 8-301931 A | 11/1996 |
| JP | 9-48818 * | 2/1997 |
| JP | 9-48818 A | 2/1997 |
| JP | 2000-239325 A | 9/2000 |
| JP | 2002-60424 A | 2/2002 |
| JP | 2002-284816 A | 10/2002 |
| JP | 2002-293835 A | 10/2002 |
| JP | 2003-155309 A | 5/2003 |
| WO | 01/29138 A1 | 4/2001 |
| WO | 02/085980 A1 | 10/2002 |

OTHER PUBLICATIONS

Database WPI Week 198535, Derwent Publications Ltd., London, GB; AN 1985-213800, XP002428720, Jul. 1985.
Shinbunsha, Nikkan Kogyou, "Illustrated Dictionary of Plastics Terms, Second Edition," Jun. 1998, p. 455, with partial English translation.
"Polymer Dictionary, Third Edition," Society of Polymer Science, Japan, Eds., Jun. 2005, p. 726, with English translation.

* cited by examiner

*Primary Examiner*—Helen L Pezzuto
(74) *Attorney, Agent, or Firm*—Kubovcik & Kubovcik (57) ABSTRACT

A thermoplastic polymer containing glutaric anhydride units of the following general formula (1) and having an absorbance at a wavelength of 280 nm of at most 0.5 (the absorbance is a value of the polymer film having a thickness of 100 μm, measured with a UV-visible spectrophotometer) and a glass transition temperature of not lower than 130° C. has high-level colorless transparency and good heat resistance, moldability and dwell stability.

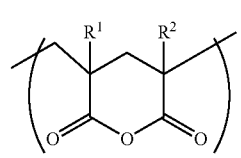

(1)

wherein $R^1$ and $R^2$ are the same or different and each represents a hydrogen atom or an alkyl group having from 1 to 5 carbon atoms.

12 Claims, 2 Drawing Sheets

Fig. 4 ated with a spectrophotometer) and a glass
THERMOPLASTIC POLYMER, PROCESS FOR PRODUCING THE SAME, AND MOLDED ARTICLE This application is a continuation-in-part of PCT/JP03/03608, filed Mar. 25, 2003.

TECHNICAL FIELD

The present invention relates to a highly heat-resistant thermoplastic copolymer that has extremely excellent colorless transparency, dwell stability, optical properties, scratch resistance and chemical resistance, to a method for producing it, and to moldings, optical materials for light transmission and transparent parts for vehicles that are formed of the thermoplastic polymer.

BACKGROUND ART

Owing to its transparency and dimensional stability, amorphous resin such as poly(methyl methacrylate) (hereinafter referred to as PMMA) and polycarbonate (hereinafter referred to as PC) is widely used, for example, in the field of various parts of optical materials, electric appliances for household use, OA appliances, automobiles, etc.

Recently, the resin of the type has become used more widely even for optical materials of higher performance, such as optical lenses, prisms, mirrors, optical discs, optical fibers, sheets and films for liquid-crystal display, optical waveguides, etc. With that, the resin is required to have further better optical properties and more improved heat resistance.

At present, the transparent resin is used also for lighter parts for automobiles, such as tail lamps and head lamps, and the recent tendency is toward reducing the distance between various lenses such as tail lamp lenses, inner lenses as well as those in headlamps or sealed beams, and the light source and toward thinning the constitutive parts for increased roominess and for better gasoline efficiency. In addition, since vehicles are driven under severe conditions, the resin for them is required to deform little at high temperature and high humidity and to have good scratch resistance, weather resistance and oil resistance.

Though having good transparency and weather resistance, PMMA resin is problematic in that its heat resistance is not satisfactory. On the other hand, PC resin has good heat resistance and impact resistance, but its birefringence that indicates the optical strain thereof is large. Therefore, the resin is problematic in that its moldings have optical anisotropy and their scratch resistance and oil resistance are extremely bad.

Accordingly, for improving the heat resistance of PMMA, a resin has been developed by introducing thereinto a maleimide monomer, a maleic anhydride monomer or the like that serves as a component of making the resin resistant to heat. However, this is problematic in that the maleimide monomer is expensive and its reactivity is low, and maleic anhydride is not stable to heat.

To solve these problems, JP-A 49-85184 and 1-103612 disclose a copolymer that contains glutaric anhydride units, and this is obtained by heating a copolymer that contains unsaturated carboxylic acid monomer units. However, since the polymerization temperature in producing the unsaturated carboxylic acid monomer units-having polymer is high, the glutaric anhydride units-having copolymer, which is obtained by heating the polymer by the use of an extruder, is still problematic in that it is extremely discolored.

On the other hand, JP-A 58-217501, 60-120707 and 1-279911 disclose a method for producing a glutaric anhydride units-having copolymer by heating a solution of an unsaturated carboxylic acid monomer units-having polymer in vacuum. However, even in the method disclosed in these patent publications, the polymerization temperature in producing the unsaturated carboxylic acid monomer units-having polymer in solution is still high. Therefore, even when the polymer solution is heated as such in vacuum in the method, the effect of retarding the discoloration of the resulting glutaric anhydride units-having copolymer is still unsatisfactory and it does not satisfy the recent requirement for a higher degree of colorlessness. Another problem with the method is that, the resulting copolymer is extremely discolored during the residence at high temperature in the air, or that is, its dwell stability (discoloration resistance) is not good, and therefore it could not be recycled.

JP-A 60-120735, 61-271343 and 9-48818 disclose a method of reducing discoloration through addition of antioxidant such as (hypo)phosphite compounds or hindered phenol compounds. The method may be effective for glutaric anhydride units-having polymer of which the heat resistance is relatively low, but is still problematic in that it could not satisfy both high heat resistance and colorless transparency.

Accordingly, an object of the invention is to provide a thermoplastic polymer which has high-level heat resistance, which solves the problem of discoloration during heating in the related art, which is prevented from being discolored while heated to form glutaric anhydride units in the resulting copolymer, and which has high-level colorless transparency and dwell stability satisfying the recent requirement; and to provide a method for producing it, and moldings that comprise the thermoplastic polymer.

DISCLOSURE OF THE INVENTION

We, the present inventors have assiduously studied so as to solve the above-mentioned problems and, as a result, have found that, when the above-mentioned, unsaturated carboxylic acid units-having copolymer, a precursor of glutaric anhydride units-having thermoplastic polymer, is prepared at a specific polymerization temperature, then it gives a thermoplastic polymer which is significantly prevented from being discolored after heat treatment, which attains high-level colorless transparency that could not be attained by any conventional knowledge, and which has excellent heat resistance, moldability and dwell stability. In addition, we have further found that the thermoplastic polymer has good optical properties, scratch resistance and chemical resistance and is favorable to applications that require high-level colorless transparency, for example, for optical materials, lighters for vehicles, etc. On the basis of these findings, we have reached the present invention.

Specifically, the constitution of the invention is summarized as follows:

[1] A thermoplastic polymer which contains glutaric anhydride units of the following general formula (1) and has an absorbance at a wavelength of 280 nm of at most 0.5 (the absorbance is a value of the polymer film having a thickness of 100 μm, measured with a spectrophotometer) and a glass transition temperature of not lower than 130° C.:

(1)

wherein $R^1$ and $R^2$ are the same or different and each represents a hydrogen atom or an alkyl group having from 1 to 5 carbon atoms.

[2] A method for producing the above-mentioned thermoplastic polymer, which comprises polymerizing a monomer mixture that contains an unsaturated carboxylic acid monomer and an unsaturated carboxylic acid alkyl ester monomer, at a temperature not higher than 90° C. to prepare a copolymer (A), followed by heating the copolymer (A) for (a) dehydration and/or (b) dealcoholation to give the thermoplastic polymer.

[3] A molding of the above-mentioned thermoplastic polymer.

[4] An optical material for light transmission, which comprises the above-mentioned thermoplastic polymer.

[5] A transparent member for vehicle lighters, which comprises the above-mentioned thermoplastic polymer.

The reference numerals used in FIGS. 1 to 4 are as follows:

1 . . . Tabular Molding
2 . . . Tool
3 . . . Curved Face
4 . . . Optical Waveguide
5 . . . Diffusion Sheet
6 . . . Reflection Sheet
7 . . . Light Source
8 . . . Reflector
9 . . . Transparent Member

BEST MODES OF CARRYING OUT THE INVENTION

The thermoplastic polymer of the invention is described concretely herein under.

As so mentioned hereinabove, the thermoplastic polymer of the invention contains glutaric anhydride units of the following general formula (1):

(1)

wherein $R^1$ and $R^2$ are the same or different and each represents a hydrogen atom or an alkyl group having from 1 to 5 carbon atoms. Above all, preferred are copolymers that contain (i) glutaric anhydride units of the above-mentioned general formula (1) and (ii) unsaturated carboxylic acid alkyl ester units; or copolymers that additionally contain (iii) unsaturated carboxylic acid units in addition to the above-mentioned units; or copolymers that further contain (iv) any other vinyl monomer units in addition to the above-mentioned (i) and (ii), or the above-mentioned (i), (ii) and (iii).

The absorbance at a wavelength of 280 nm of thermoplastic polymer of the invention must be at most 0.5 (the absorbance as referred to herein is a value of the polymer film having a thickness of 100 μm, measured with a spectrophotometer).

In addition, the inventors have found that the thermoplastic polymer of the invention having the absorbance characteristic to fall within a specific range at the above-mentioned specific wavelength gives good-toned moldings having an yellowness index of at most 5. The yellowness index as referred to herein is measured as follows: The thermoplastic polymer is pressed at a temperature of (glass transition temperature of the polymer+100° C.) to give a molding having a thickness of 1 mm, and this is measured with an SM color computer (by Suga Test Instruments) according to JIS-K7103 to obtain the YI value of the polymer.

Further, the glass transition temperature (Tg) of the thermoplastic polymer of the invention must be at least 130° C. in view of the heat resistance of the polymer. The glass transition temperature (Tg) as referred to herein is measured with a differential scanning calorimeter (DSC-7 Model by Perkin Elmer), in which the polymer heating rate is 20° C./min.

The thermoplastic polymer of the invention that contains glutaric anhydride units of the above-mentioned general formula (1) may be produced basically according to the method mentioned below. Specifically, an unsaturated carboxylic acid monomer and an unsaturated carboxylic acid alkyl ester monomer to give glutaric anhydride units (i) of the above-mentioned general formula (1) in the subsequent heating step, and, in case where the polymer shall contain any other vinyl monomer units (iv) mentioned above, a vinyl monomer to give the units are copolymerized to prepare a copolymer (A), and the copolymer (A) is then heated in the presence or absence of a suitable catalyst for intramolecular cyclization through (a) dehydration and/or (b) dealcoholation to give the intended polymer. Typically in this, the copolymer (A) is heated whereby the carboxyl groups of the two unsaturated carboxylic acid units (iii) therein are dehydrated, or an alcohol is removed from the neighboring unsaturated carboxylic acid unit (iii) and unsaturated carboxylic acid alkyl ester unit (ii) therein to form one glutaric anhydride unit mentioned above.

The unsaturated carboxylic acid monomer to be used in this is not specifically defined, and may be any and every unsaturated carboxylic acid monomer capable of copolymerizing with any other vinyl compound. Unsaturated carboxylic acid monomers preferred for use herein are compounds of the following general formula (4):

(4)

wherein $R^3$ represents a hydrogen atom or an alkyl group having from 1 to 5 carbon atoms, maleic acid, and further hydrolyzates of maleic anhydride, etc. As producing especially good heat stability, preferred are acrylic acid and methacrylic acid; and more preferred is methacrylic acid. One or more of these compounds may be used herein. When copolymerized, the unsaturated carboxylic acid monomer of the above-mentioned general formula (4) gives the unsaturated carboxylic acid unit of the following general formula (2).

(2)

The unsaturated carboxylic acid alkyl ester monomer is not also specifically defined, and its preferred examples are compounds of the following general formula (5):

(5)

wherein $R^4$ represents a hydrogen atom or an alkyl group having from 1 to 5 carbon atoms; and $R^5$ represents an aliphatic or alicyclic hydrocarbon group having from 1 to 6 carbon atoms, or an aliphatic or alicyclic hydrocarbon group having from 1 to 6 carbon atoms and substituted with one or more, not exceeding the number of its carbon atoms, of hydroxyl groups or halogen atoms.

Of those, especially preferred are acrylates and/or methacrylates having an aliphatic or alicyclic hydrocarbon group with from 1 to 6 carbon atoms or having the substituted hydrocarbon group. When copolymerized, the unsaturated carboxylic acid alkyl ester monomer of the above-mentioned general formula (5) gives the unsaturated carboxylic acid alkyl ester unit of the following general formula (3).

(3)

Preferred examples of the unsaturated carboxylic acid alkyl ester monomer are methyl(meth)acrylate, ethyl(meth) acrylate, n-propyl(meth)acrylate, n-butyl(meth)acrylate, t-butyl(meth)acrylate, n-hexyl(meth)acrylate, cyclohexyl (meth)acrylate, chloromethyl(meth)acrylate, 2-chloroethyl (meth)acrylate, 2-hydroxyethyl(meth)acrylate, 3-hydroxypropyl(meth)acrylate, 2,3,4,5,6-pentahydroxyhexyl(meth) acrylate, 2,3,4,5-tetrahydroxypentyl(meth)acrylate, etc. Of those, methyl methacrylate is the most preferred. One or more of these compounds may be used herein.

In producing the copolymer (A) for use in the invention, any other vinyl monomer may be used, not detracting from the effect of the invention. Preferred examples of the additional vinyl monomer are aromatic vinyl monomers such as styrene, α-methylstyrene, o-methylstyrene, p-methylstyrene, o-ethylstyrene, p-ethylstyrene, p-t-butylstyrene; vinyl cyanide monomers such as acrylonitrile, methacrylonitrile, ethacrylonitrile; and allyl glycidyl ether, styrene p-glycidyl ether, p-glycidylstyrene, maleic anhydride, itaconic anhydride, N-methylmaleimide, N-ethylmaleimide, N-cyclohexylmaleimide, N-phenylmaleimide, acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine, p-aminostyrene, 2-isopropenyl-oxazoline, 2-vinyl-oxazoline, 2-acryloyl-oxazoline, 2-styryl-oxazoline, etc. In view of the transparency, the birefringence and the chemical resistance of the polymer to be produced, preferred are monomers with no aromatic ring. One or more of these compounds may be used herein.

For producing the copolymer (A), employable is any known polymerization method of bulk polymerization, solution polymerization, suspension polymerization, emulsion polymerization or the like basically through radical polymerization. Especially preferred is solution polymerization, bulk polymerization or suspension polymerization as giving fewer impurities.

The thermoplastic polymer of the invention has an absorbance characteristic and a glass transition temperature that fall within a specific range. For obtaining the thermoplastic polymer of the type, it is a matter of importance that the above-mentioned copolymer (A) is prepared by polymerizing a monomer mixture that contains an unsaturated carboxylic acid monomer and an unsaturated carboxylic acid alkyl ester monomer, at a polymerization temperature of not higher than 90° C., as so mentioned hereinabove. For more effectively preventing the polymer discoloration after heat treatment, the polymerization temperature is preferably at most 80° C., more preferably at most 70° C. The lowermost limit of the polymerization temperature is not specifically defined so far as the polymerization may go on at that temperature. In view of the productivity in consideration of the polymerization rate, it is generally at least 50° C., but preferably at least 60° C. For increasing the polymerization yield and the polymerization rate, the polymerization temperature maybe elevated with the progress of polymerization. Also in this case, the uppermost limit of the elevated temperature should be indispensably controlled to at most 90° C. Preferably, the polymerization-initiating temperature is relatively low, not higher than 75° C. The polymerization time is not specifically defined so far as it is enough to obtain the necessary degree of polymerization. In view of the production efficiency, it preferably falls within the range from 60 minutes to 360 minutes, more preferably from 90 minutes to 180 minutes.

The monomer blend ratio to give the monomer mixture for use in producing the copolymer (A) in the invention is described. Based on the monomer mixture of 100% by weight, the unsaturated carboxylic acid monomer preferably accounts for from 15 to 50% by weight, more preferably from 20 to 45% by weight; and the unsaturated carboxylic acid alkyl ester monomer preferably accounts for from 50 to 85% by weight, more preferably from 55 to 80% by weight. In case where any other vinyl monomer copolymerizable with these is used, it preferably accounts for from 0 to 35% by weight.

If the amount of the unsaturated carboxylic acid monomer is smaller than 15% by weight, the amount of the glutaric anhydride units of the above-mentioned general formula (1) to be formed through heat treatment of the copolymer (A) will be small and will be therefore ineffective for improving the heat resistance of the final polymer. On the other hand, if the amount of the unsaturated carboxylic acid monomer is larger than 50% by weight, a large amount of unsaturated carboxylic acid units will remain in the final polymer after cyclization of the copolymer (A) under heat, and will worsen the colorless transparency and the dwell stability of the final polymer.

In the invention, the method of heating the copolymer (A) for intramolecular cyclization through (a) dehydration and/or (b) dealcoholation to give the intended thermoplastic polymer that contains glutaric anhydride units is not specifically defined. For it, preferred is a process of introducing the copolymer into a vented extruder under heat to produce the intended polymer; or a process of heating the copolymer in a device capable of being heated for vapor removal in an inert gas atmosphere or in vacuum to produce the intended polymer. In particular, when the copolymer is heated for intramolecular cyclization in the presence of oxygen, the resulting polymer may yellow. Therefore, it is desirable that the reaction system is fully purged with inert gas such as nitrogen. For the apparatus especially preferred for the method, for example, mentioned are single-screw, double-screw or triple-screw extruders equipped with "unimelt" type screw(s), or continuous or batch type kneaders. Especially preferred is a double-screw extruder.

The temperature at which the copolymer is heated for vapor removal according to the above-mentioned method is not specifically defined, provided that the copolymer heated at the temperature undergoes intramolecular cyclization through (a) dehydration and/or (b) dealcoholation. Preferably, it falls within the range from 180° C. to 300° C., more preferably from 200° C. to 280° C.

Also not specifically defined, the time taken for vapor removal under heat in the method may be suitably determined depending on the desired copolymerization ratio, and it generally falls within the range from 1 minute to 60 minutes, preferably from 2 minutes to 30 minutes, more preferably from 3 minutes to 20 minutes. In particular, it is desirable that the ratio of length/diameter (L/D) of extruder screws is at least 40, more preferably at least 50, even more preferably at least 60 for ensuring the necessary heating time enough for good intramolecular cyclization of the copolymer in extruders. If the copolymer is processed in extruders having a small ratio L/D, a large amount of non-reacted unsaturated carboxylic acid units will remain in the resulting polymer. If so, the non-reacted units will re-react while the polymer is molded under heat, and the resulting moldings will have silver marks or bubbles and, in addition, the polymer will be greatly discolored while it is in molding machines. Though not specifically defined, the uppermost limit of L/D is generally around 100.

In the invention, in addition, at least one of acid, alkali and salt compounds, which serve as a catalyst for promoting the cyclization of the copolymer (A) into glutaric anhydrides under heat according to the method as above, may be added to the reaction system. Its amount to be added is not specifically defined, suitably falling approximately within the range from 0.01 to 1 part by weight based on 100 parts by weight of the copolymer (A). The type of such acid, alkali and salt compounds is not also specifically defined. The acid catalyst includes hydrochloric acid, sulfuric acid, p-toluenesulfonic acid, phosphoric acid, phosphorous acid, phenylphosphonic acid, methyl phosphate, etc. The base catalyst includes metal hydroxides, amines, imines, alkali metal derivatives, alkoxides, ammonium hydroxides, etc. The salt catalyst includes metal acetates, metal stearates, metal carbonates, etc. However, the range of the catalyst must be so controlled that the color of the catalyst does not have any negative influence on the coloration of the thermoplastic polymer and does not lower the transparency of the polymer. Above all, alkali metal-having compounds are preferred as highly effective for reaction promotion even though a relatively small amount of the compound is added to the reaction system. Concretely, they include hydroxides such as lithium hydroxide, sodium hydroxide, potassium hydroxide; alkoxide compounds such as sodium methoxide, sodium ethoxide, sodium phenoxide, potassium methoxide, potassium ethoxide, potassium phenoxide; and organic carboxylates such as lithium acetate, sodium acetate, potassium acetate, sodium stearate. Of those, preferred are sodium hydroxide, sodium methoxide, lithium acetate, and sodium acetate.

The content of the glutaric anhydride units of the above-mentioned general formula (1) in the thermoplastic polymer of the invention is not specifically defined provided that the absorbance characteristic and the glass transition temperature of the polymer fall within the range of the invention. Preferably, however, it accounts for from 25 to 50% by weight, more preferably from 30 to 45% by weight in the thermoplastic polymer of 100% by weight. If the content of the glutaric anhydride units is smaller than 25% by weight, the heat resistance of the polymer will be low and, in addition, the polymer could not have good birefringence characteristic (optical isotropy) and chemical resistance.

Preferably, the thermoplastic polymer of the invention is a copolymer that comprises the above-mentioned glutaric anhydride units and unsaturated carboxylic acid alkyl ester monomer units. In this, the amount of the unsaturated carboxylic acid alkyl ester monomer units is preferably from 50 to 75% by weight, more preferably from 55 to 70% by weight.

For quantifying the constitutive units in the thermoplastic polymer of the invention, generally employed are an IR spectrophotometer and a proton nuclear magnetic resonance ($^1$H-NMR) analyzer. In IR spectrometry, glutaric anhydride units are characterized by absorption at 1800 cm$^{-1}$ and 1760 cm$^{-1}$, and can be differentiated from unsaturated carboxylic acid units and unsaturated carboxylic acid alkyl ester units. In $^1$H-NMR, for example, a copolymer that comprises glutaric anhydride units, methacrylic acid and methyl methacrylate is analyzed as follows, in point of the spectral assignment in a solvent of deutero-dimethylsulfoxide: The hydrogen atom of the a-methyl group of methacrylic acid, methyl methacrylate and glutaric anhydride cyclo-compounds gives a peak at from 0.5 to 1.5 ppm; the hydrogen atom of the methylene group in the polymer backbone chain gives a peak at from 1.6 to 2.1 ppm; the hydrogen atom of the carboxylate (—COOCH$_3$) of methyl methacrylate gives a peak at 3.5 ppm; and the hydrogen atom of the carboxylic acid of methacrylic acid gives a peak at 12.4 ppm. From the integral ratio of the spectral pattern, the copolymer composition can be determined. Other copolymers that contain styrene in addition to the above-mentioned copolymerization components give an additional peak at from 6.5 to 7.5 ppm for the hydrogen atom of the aromatic ring of styrene, and their copolymer composition may be determined also from the spectral ratio like the above.

The thermoplastic polymer of the invention may contain at most 10% by weight of unsaturated carboxylic acid units and/or at most 10% by weight of other copolymerizable vinyl monomer units.

More preferably, the amount of the unsaturated carboxylic acid units in the thermoplastic polymer of the invention is from 0 to 5% by weight, most preferably from 0 to 1% by weight. If the amount of the unsaturated carboxylic acid units is over 10% by weight, the colorless transparency and the dwell stability of the polymer may lower.

Also more preferably, the amount of the other copolymerizable vinyl monomer units is from 0 to 5% by weight. In particular, when the polymer contains units of an aromatic vinyl monomer such as styrene and if the contents of the units is over the above-mentioned range, the colorless transparency, the optical isotropy and the chemical resistance of the polymer may lower.

Preferably, the thermoplastic polymer of the invention has an intrinsic viscosity of from 0.1 to 0.7 dl/g, more preferably from 0.3 to 0.6 dl/g, measured in dimethylformamide at 30° C. Though not specifically defined, the polymer shall have a weight-average molecular weight of from 10,000 to 30,000, but preferably from 50,000 to 200,000, more preferably from 70,000 to 150,000 in view of the mechanical properties and the mold ability thereof. The molecular weight of the thermoplastic polymer of the invention may be measured through gel permeation chromatography in N,N'-dimethylformamide, based on a standard sample of polymethyl methacrylate.

Thus obtained, the thermoplastic polymer of the invention has the following characteristics. Specifically, it has an absorbance at a wavelength of 280 nm of at most 0.5 (the absorbance is a value of the polymer film having a thickness of 100 µm, measured with a spectrophotometer), more preferably at most 0.4, even more preferably at most 0.3. The lowermost limit of the absorbance of the polymer is generally about 0.2. Satisfying the absorbance characteristic that falls within the specific range as above, the thermoplastic polymer may have a good colorlessness. An yellowness index may be a concrete index of the tone of the polymer. The thermoplastic polymer of the invention preferably has an yellowness index of at most around 6, more preferably at most 5, even more preferably at most 4, most preferably at most 3, and its colorlessness is extremely good.

The thermoplastic polymer of the invention has a glass transition temperature (Tg) of not lower than 130° C., and is therefore well resistant to heat. Preferably, its glass transition temperature is not lower than 140° C., more preferably not lower than 150° C., and its heat resistance is extremely good.

The thermoplastic polymer of the invention may have a birefringence of at most $1.0 \times 10^{-4}$ in terms of the absolute value, and its optical isotropy is good. Preferably, the birefringence of the polymer is at most $0.7 \times 10^{-4}$, most preferably at most $0.5 \times 10^{-4}$. The lowermost limit of the birefringence is not specifically defined, and the ideal birefringence is 0. In general, however, the birefringence is at least $0.01 \times 10^{-4}$. The birefringence in terms of the absolute value as referred to herein is obtained as follows: An oriented film of the polymer, which is produced in a casting process and has a thickness of 100±5 µm, is monoaxially stretched by 1.5 times at its glass transition temperature, and its retardation at 23° C. and 405 nm is measured according to ASTM D542. This is divided by the thickness to give the birefringence of the polymer in terms of the absolute value.

We, the present inventors have found that the thermoplastic polymer of the invention has a specific high surface hardness (in terms of pencil hardness) and its scratch resistance is good. In the invention, the surface hardness of the polymer, in terms of the pencil hardness, is preferably at least 4H, more preferably at least 5 H. The pencil hardness is measured as follows: The thermoplastic polymer is pressed into a molding of 50 mm×50 mm×1 mm, at its glass transition temperature+100° C., and this is tested according to JIS-K-5401 to obtain its pencil hardness.

Preferably, the thermoplastic polymer of the invention has a total light transmittance of at least 85% (the total light transmittance is a value of the molding formed by pressing the thermoplastic polymer at its glass transition temperature+100° C. to have a size of 50 mm×50 mm×1 mm, measured according to JIS-K-6714), more preferably at least 88%, even more preferably at least 90%, and its transparency is high. Therefore, the material that comprises the thermoplastic polymer can exhibit good properties enough for optical applications. Also preferably, the UV transmittance of the polymer within a short wavelength range of from 350 to 410 nm is at least 85%, more preferably at least 88%, and is high. The transmittance within the wavelength range is needed for writing and reading on optical discs with short-wave laser rays. When the light-transmitting optical material that comprises the copolymer of the invention can exhibit excellent properties when used for optical discs. The UV transmittance within the short wavelength range can be measured with a UV-visible spectrophotometer.

In addition, the thermoplastic polymer of the invention may optionally contain any additive of, for example, UV absorbent and antioxidant such as hindered phenols, benzotriazoles, benzophenones, benzoates, and cyanoacrylate; lubricant and plasticizer such as higher fatty acids, acid esters, acid amides, and higher alcohols; mold release agent such as montanic acid and its salts, esters and half esters, stearyl alcohol, stearamide and ethylene wax; discoloration inhibitor such as phosphates, and hypophosphites; halogen-containing flame retardant; non-halogen flame retardant such as phosphorus compounds, and silicon compounds; nucleating agent; antistatic agent such as amines, sulfonates, and polyethers; colorant such as pigment. However, the range of the additive must be so controlled that the color of the additive does not have any negative influence on the thermoplastic polymer and does not lower the transparency of the polymer.

The thermoplastic polymer of the invention has good mechanical properties and moldability, and is melt-moldable. For its use, therefore, it may be extruded, injection-molded and pressed into films, sheets, tubes, rods and other moldings of any desired shape and size.

Having good heat resistance, the moldings of the thermoplastic polymer of the invention are usable in various applications, for example, for parts of electric and electronic appliances, automobile parts, parts of mechanical structures, and parts and housings of OA appliances and electric and electronic appliances for household use, and also for various general goods.

Concrete applications of the moldings of the thermoplastic polymer of the invention are, for example, parts of electric and electronic appliances, such as typically housings of electric appliances, housings of OA appliances, various covers, various gears, various cases, sensors, LED lamps, connectors, sockets, resistors, relay cases, switches, coil bobbins, capacitors, variable capacitor cases, optical pickups, oscillators, plates for various terminals, transformers, plugs, boards for printed circuits, tuners, speakers, microphones, headphones, small-sized motors, magnetic head bases, power modules, housings, semiconductors, liquid-crystal appliances, FDD carriages, FDD chassis, motor brush holders, parabolic antennas, computer-related parts; parts of electric appliances for household and office use, such as typically VTR parts, TV parts, irons, hair driers, rice cooker parts, microwave range parts, acoustic parts, parts of sound appliances including audios, laser discs and compact discs, lighting parts, refrigerator parts, air conditioner parts, typewriter parts, word processor parts; office computer-related parts, telephone-related parts, facsimile-related parts, duplicator-related parts, washing tools; machine-related parts, such as typically various bearings including oilless bearings, stern bearings and underwater bearings, motor parts, lighters, typewriters; optical instrument-related parts and precision instrument-related parts, such as typically parts of microscopes, binoculars, cameras, watches; alternator terminals, alternator connectors, IC regulators, various valves including exhaust gas valves, various pipes for fuel-related intake and emission systems, air intake nozzle snorkels, intake manifolds, fuel pumps, engine-cooling water joints, carburetor main bodies, carburetor spacers, exhaust gas sensors, cooling water sensors, oil temperature sensors, brake pad wear sensors, throttle position sensors, crank shaft position sensors, air flow meters, thermostat bases for air conditioners, air flow control valves for heaters, brush holders for radiator motors, water pump impellers, turbine veins, wiper motor-related parts, distributors, starter switches, starter relays, wire harnesses for transmissions, windshield washer nozzles, air conditioner panel switch boards, coils for fuel-related solenoid valves, connectors for fuses, horn terminals, insulating boards for electric parts, step motor rotors, lamp sockets, lamp reflectors, lamp housings, brake pistons, solenoid bobbins, engine oil filters, ignition cases, etc. In addition, since the polymer has excellent transparency and heat resistance, it is extremely useful in other various applications of, for example, visual instrument-related parts such as image pickup lenses, finder lenses, filters, prisms and Fresnel lenses for cameras, VTR, projection TV; optical recording and optical communication-related parts such as substrates of various optical discs (VD, CD, DVD, MD, LD, etc.), protective films for various disc substrates, optical disc player pickup lenses, optical fibers, optical switches, optical connectors; information instrument-related parts such as optical waveguides, Fresnel lenses, polarizing plates, protective films for polarizing plates, phase-contrast films, light diffusion films, view angle expansion films, reflection films, antireflection films, anti-glare films, brightness improver films, prism sheets, pickup lenses, touch panel waveguide films and covers for liquid-crystal displays, flat panel displays and plasma displays; automobile and other vehicle-related parts such as tail lamp lenses, head lamp lenses, inner lenses, invar caps, reflectors, extensions, side view mirrors, rearview mirrors, side visors, gauge needles, gauge covers, and glazing for typically windshields; medical instrument-related parts such as lenses for glasses, frames for glasses, contact lenses, endoscopes, optical cells for analysis; construction-related parts such as day lighting windowpanes, transparent plates for roads, lighting covers, signboards, transparent sound barriers, materials for bathtubs, etc.

In particular, since the polymer has excellent heat resistance and colorless transparency and has a low birefringence (good optical isotropy), it is favorable for transparent optical materials, especially for optical waveguides for backlights for liquid-crystal displays and also for lighting instruments such as backlights for meter panels or touch panels, etc.

In addition, since the thermoplastic polymer of the invention satisfies both high-level colorless transparency and excellent chemical resistance, it is favorable for transparent materials for lighters for automobiles and other vehicles. "Vehicle" as used herein has a broad sense of the word, including automotive bicycles, automotive tricycles, automotive four-wheelers and other automobiles, railroad cars, vehicles for industrial use such as fork lifts and others. "Lighters for vehicles" as used herein are meant to indicate lighters for illumination or discrimination that are mounted on such various vehicles. Though not specifically defined, they include head lamps, tail lamps, stop lamps, winkers, side-marker lights, backup lights, etc.

EXAMPLES

The constitution and the effect of the invention are described more concretely with reference to the following Examples. Needless-to-say, the invention should not be limited to the following Examples. Prior to describing the Examples, the methods employed in the Examples for measuring various physical properties are described.

(1) Solution Viscosity:

The intrinsic viscosity of the thermoplastic polymer obtained was measured in a solvent of dimethylformamide at 30° C.

(2) Glass Transition Temperature (Tg):

Using a differential scanning calorimeter (Perkin Elmer's DSC-7 Model), the polymer was heated in a nitrogen atmosphere at a rate of 20° C./min, and its Tg was measured.

(3) Absorbance at 280 nm:

A 20 wt. % solution in THF of the thermoplastic polymer obtained was prepared, and this was cast to form a 100 μm film. Using a UV-visible spectrophotometer, Shimadzu's UV-1600PC, the absorbance of the film at 280 nm was measured.

(4) Yellowness Index:

The thermoplastic polymer obtained was press-molded at its glass transition temperature+100° C. to form a sheet having a thickness of 1 mm, and its YI value was measured according to JIS-K7103, using an SM color computer (by Suga Test Instruments).

(5) Transparency (Total Light Transmittance, Haze):

The thermoplastic polymer was press-molded at its glass transition temperature+100° C. to form a sheet having a size of 50×50×1 mm. Using a direct-reading haze meter by Toyo Seiki, the total light transmittance (%) and the haze (%) of the sheet were measured at 23° C., from which the transparency of the polymer was evaluated.

(6) Optical Isotropy (Birefringence):

According to the same casting process as in (3), a non-oriented film having a thickness of 100 μm was formed of the thermoplastic polymer. This was monoaxially stretched by 1.5 times at its glass transition temperature. According to ASTM D542 and using an ellipsometer (LCD cell gap detector RETS-1100 by Otsuka Electronics), the oriented film was exposed to a laser ray running toward the film surface at an angle of 90°, at 23° C., and the retardation (Re)

of the transmitted light at 405 nm was measured. In addition, using Mitsutoyo's Digimatic Indicator, the thickness (d) of the cast film at 23° C. was measured. Based on these, the birefringence (Δn) of the polymer was obtained according to the following equation:

$$\Delta n = Re(nm)/d(nm).$$

(7) Pencil Hardness:

A sheet having a size of 70 mm×70 mm×1 mm was formed through injection molding of the thermoplastic polymer, and its pencil hardness was measured according to JIS-K-5401.

(8) Dwell Stability (YI Change Before and After Dwell):

The thermoplastic polymer obtained was kept staying in an injection molding machine for 20 minutes at its glass transition temperature+140° C. Before and after the dwell time, the polymer was injection-molded into a sheet having a size of 70×70×1 mm, and the YI difference (ΔYI) between the sheets was obtained in terms of the absolute value.

Figure 1:
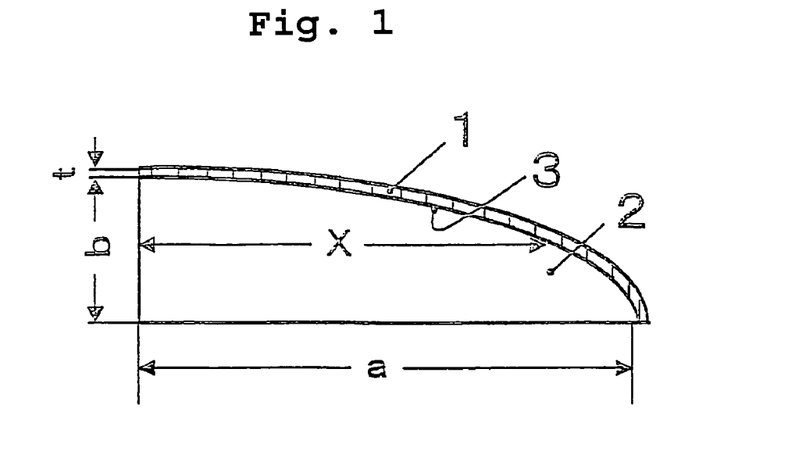
FIG. 1 is an outline view of a ¼ oval tool for use in chemical resistance test.

(9) Chemical Resistance (Critical Strain):

As in FIG. 1, a tabular test piece 1 that had been formed of the thermoplastic polymer through injection molding to have a size of 12.5×125×1.6 mm was fixed on a ¼ oval tool 2 to run along the curved face 3 of the tool. A chemical, wax remover (Yushiro Chemical's Wax Remover CPC) was applied to the entire surface of the test piece and left at 23° C. for 1 hour. Then, the test piece was checked for cracks appearing in its face and for the position of the cracks. The shortest length (X) to the cracked position in the direction of the major axis of the toll was measured. According to the following equation, the critical strain τ (%) of the sample was obtained. Samples having a higher critical strain value have higher chemical resistance.

$$\tau = b/2a^2 \{1-(a^2-b^2)X^2/a^4\}^{-3/2} \times t \times 100$$

wherein
τ is the critical strain (%),
a is the length of the major axis of the tool (127 mm),
b is the length of the minor axis of the tool (38.1 mm),
t is the thickness of the test piece (1.6 mm),
X is the length to the cracked position in the direction of the major axis of the toll (mm).

Reference Example (1)

Production of Copolymers (A)

(A-1):

A solution prepared by dissolving 0.05 parts of methyl methacrylate/acrylamide copolymer suspension (this was prepared as follows: 20 parts by weight of methyl methacrylate, 80 parts by weight of acrylamide, 0.3 parts by weight of potassium persulfate, and 1500 parts by weight of ion-exchanged water were put into a reactor, and kept at 70° C. while purged with nitrogen gas; the reaction was continued until the monomers were completely converted into a polymer, and an aqueous solution of methyl acrylate-acrylamide copolymer was obtained; thus obtained, the aqueous solution was used as a suspension) in 165 parts of ion-exchanged water was fed into a stainless autoclave having a capacity of 5 liters and equipped with a baffle and a Pfaudler stirrer, and stirred at 400 rpm, and then purged with nitrogen gas. Next, a mixture of the following substances was added to it with stirring, and heated up to 70° C. At the time when the inner temperature reached 70° C., the polymerization began. After kept as such for 180 minutes, the polymerization finished. After this, the reaction system was cooled and the polymer was separated, washed and dried in an ordinary manner to a copolymer (A-1) in the form of beads. The yield of polymerization of the copolymer (A-1) was 98%.

| Methacrylic acid | 30 parts by weight |
| Methyl methacrylate | 70 parts by weight |
| t-dodecylmercaptan | 0.6 parts by weight |
| 2,2'-Azobisisobutyronitrile | 0.4 parts by weight |

(A-2):

A copolymer (A-2) was obtained in the same manner as that for (A-1) except that the polymerization temperature and time were changed as follows: At the time when the inner temperature reached 70° C., the polymerization began, and after kept at 70° C. for 20 minutes, this was further heated up to 80° C., and then, this was polymerized at the elevated temperature for 180 minutes. The yield of polymerization of the copolymer was 97%.

(A-3):

A copolymer (A-3) was obtained in the same manner as that for (A-1) except that the polymerization temperature and time were changed as follows: At the time when the inner temperature reached 70° C., the polymerization began, and after kept at 70° C. for 20 minutes, this was further heated up to 90° C., and then, this was polymerized at the elevated temperature for 180 minutes. The yield of polymerization of the copolymer was 98%.

(A-4):

A copolymer (A-4) was obtained in the same manner as that for (A-1) except that the amount of the chain transfer agent, t-dodecylmercaptan was changed to 1.2 parts by weight. The yield of polymerization of the copolymer was 98%.

(A-5):

A copolymer (A-5) was obtained in the same manner as that for (A-4) except that the monomer mixture was changed to the following. Its yield of polymerization was 95%.

| Methacrylic acid | 15 parts by weight |
| Methyl methacrylate | 85 parts by weight |

(A-6):

A copolymer (A-6) was obtained in the same manner as that for (A-4) except that the monomer mixture was changed to the following. Its yield of polymerization was 92%.

| Methacrylic acid | 45 parts by weight |
| Methyl methacrylate | 55 parts by weight |

(A-7):

A copolymer (A-7) was obtained in the same manner as that for (A-4) except that the monomer mixture was changed to the following. Its yield of polymerization was 93%.

| | |
|---|---|
| Methacrylic acid | 20 parts by weight |
| Methyl methacrylate | 73 parts by weight |
| Styrene | 7 parts by weight |

(A-8):

A copolymer (A-8) was obtained in the same manner as that for (A-1) except that the polymerization temperature and time were changed as follows: At the time when the inner temperature reached 70° C., the polymerization began, and after kept at 70° C. for 20 minutes, this was further heated up to 75° C. and kept at the temperature for 120 minutes, and then this was still further heated up to 98° C. and polymerized at the temperature for 60 minutes. The yield of polymerization of the copolymer was 97%.

(A-9):

A copolymer (A-9) was obtained in the same manner as that for (A-8) except that the monomer mixture was changed to the following. Its yield of polymerization was 95%.

| | |
|---|---|
| Methacrylic acid | 15 parts by weight |
| Methyl methacrylate | 85 parts by weight |

(A-10):

A copolymer (A-10) was obtained in the same manner as that for (A-8) except that the monomer mixture was changed to the following. Its yield of polymerization was 93%.

| | |
|---|---|
| Methacrylic acid | 20 parts by weight |
| Methyl methacrylate | 73 parts by weight |
| Styrene | 7 parts by weight |

(A-11):

A copolymer (A-11) was obtained in the same manner as that for (A-8) except that the monomer mixture was changed to the following. Its yield of polymerization was 93%.

| | |
|---|---|
| Methacrylic acid | 20 parts by weight |
| Methyl methacrylate | 65 parts by weight |
| Styrene | 15 parts by weight |

Various properties of the copolymers (A) are shown in Table 1.

TABLE 1

| | Polymerization Temperature (° C.) | Copolymer Composition (wt. %) | | | Intrinsic Viscosity dl/g |
|---|---|---|---|---|---|
| | | MMA | MAA | St | |
| A-1 | 70 | 70 | 30 | | 0.48 |
| A-2 | 70 → 80 | 70 | 30 | | 0.49 |
| A-3 | 70 → 90 | 70 | 30 | | 0.50 |
| A-4 | 70 | 70 | 30 | | 0.42 |
| A-5 | 70 | 85 | 15 | | 0.39 |
| A-6 | 70 | 60 | 40 | | 0.44 |
| A-7 | 70 | 73 | 20 | 7 | 0.42 |
| A-8 | 70 → 98 | 70 | 30 | | 0.49 |
| A-9 | 70 → 98 | 85 | 15 | | 0.43 |
| A-10 | 70 → 98 | 73 | 20 | 7 | 0.46 |
| A-11 | 70 → 98 | 65 | 20 | 20 | 0.44 |

Examples 1 to 3, Comparative Example 1

As in Table 2, each beady copolymer (A) that had been obtained in Reference Example (1) was heated at 250° C. in vacuum under a reduced pressure of 2.6 kPa for 30 minutes in a square vacuum temperature-controlled drier (Yamato Science's DP-32 Model) to be a thermoplastic polymer (B) having glutaric anhydride units. Thus obtained, the thermoplastic polymers (B) were analyzed with an IR spectrophotometer, and they all gave an absorption peak at 1800 cm$^{-1}$ and 1760 cm$^{-1}$. This confirms that all the thermoplastic polymers (B) had glutaric anhydride units formed therein. Next, the polymers were further analyzed through $^1$H-NMR to quantify the copolymerization composition thereof, and the data obtained and the other data of the polymer samples measured are given in Table 2 and Table 3.

TABLE 2

| | Type of Starting Copolymer (A) | Copolymerization Composition (wt. %) of Thermoplastic Polymer (B) | | | | Intrinsic Viscosity (dl/g) | Tg (° C.) | Absorbance at 280 nm |
|---|---|---|---|---|---|---|---|---|
| | | (i) GAH | (ii) MMA | (iii) MAA | (iv) St | | | |
| Example 1 | (A-1) | 32 | 60 | 8 | — | 0.47 | 153 | 0.34 |
| Example 2 | (A-2) | 32 | 60 | 8 | — | 0.46 | 152 | 0.38 |
| Example 3 | (A-3) | 32 | 60 | 8 | — | 0.49 | 152 | 0.47 |
| Comparative Example 1 | (A-8) | 32 | 60 | 8 | — | 0.50 | 151 | 0.85 |

TABLE 3

| | YI | Transparency Total light Transmittance (%) | Haze (%) |
|---|---|---|---|
| Example 1 | 2.4 | 93 | 3.0 |
| Example 2 | 3.4 | 92 | 3.9 |
| Example 3 | 6.3 | 92 | 4.2 |

TABLE 3-continued

| | | Transparency | |
|---|---|---|---|
| | YI | Total light Transmittance (%) | Haze (%) |
| Comparative Example 1 | 25.1 | 90 | 6.4 |

From the results of Examples 1 to 3 and Comparative Example 1, it is understood that, when the monomers are polymerized at a temperature not higher than 90° C. according to the production method of the invention, then thermoplastic polymers having an absorbance characteristic to fall within a specific range and having good colorless transparency and high-level heat resistance can be obtained.

On the other hand, when the monomers are polymerized at a temperature higher than 90° C. as in Comparative Example 1, then the polymer obtained could not be highly colorless.

[Examples 4 to 16, Comparative Examples 2 to 11]

As in Table 4, each copolymer (A) that had been obtained in Reference Example (1) was processed in a double-screw extruder (TEX30 (by Japan Steel Work, L/D=44.5) or PCM-30 (Ikegai Tekko, L/D=28.0)) for intramolecular cyclization to be a thermoplastic polymer in the form of pellets. The number of screw revolutions was 100 rpm, the feed rate of the starting copolymer was 5 kg/h, and the cylinder temperature was 290° C. Except in Example 15, the system was purged with nitrogen at a rate of 10 liters/min through the hopper during extrusion.

Next, the pellets were dried at 100° C. for 3 hours, and then injection-molded into test pieces, using an injection molding machine, Meiki's M-50AII-SJ. The molding condition was as follows: The molding temperature was the glass transition temperature of the polymer+140° C.; the mold temperature was 80° C.; the injection speed was 88 cm$^3$/sec; the injection time was 10 seconds; the cooling time was 30 seconds; and the molding pressure was the pressure under which the mold could be completely filled with resin (lowermost molding pressure)+1 MPa.

The polymers were analyzed through $^1$H-NMR to quantify the copolymerization composition thereof, and the data obtained and the other data of the polymer samples measured are given in Table 4 and Table 5.

In Comparative Examples 10 and 11, PMMA (Delpet 80 N by Asahi Kasei) and PC (Iupilon S3000 by Mitsubishi Engineering Plastics), respectively, were injection-molded under the same molding condition as above, and the resulting test pieces were evaluated, and the test data are given in the Tables.

TABLE 4

| | Extruder L/D | Nitrogen Purge | Type of Starting Copolymer (A) | Additive (wt. pt.) | Copolymerization Composition (wt. %) of Thermoplastic Polymer (B) | | | | Intrinsic Viscosity (dl/g) | Tg (° C.) | Absorbance at 280 nm |
|---|---|---|---|---|---|---|---|---|---|---|---|
| | | | | | (i) GAH | (ii) MMA | (iii) MAA | (iv) St | | | |
| Ex. 4 | 44.5 | yes | (A-1) | — | 32 | 63 | 5 | — | 0.49 | 147 | 0.42 |
| Ex. 5 | | | (A-4) | | 32 | 64 | 4 | — | 0.40 | 142 | 0.29 |
| Ex. 6 | | | (A-5) | | 13 | 83 | 4 | — | 0.40 | 132 | 0.37 |
| Ex. 7 | | | (A-6) | | 43 | 49 | 8 | — | 0.43 | 160 | 0.44 |
| Ex. 8 | | | (A-7) | | 16 | 72 | 5 | 7 | 0.42 | 135 | 0.42 |
| Ex. 9 | | | (A-4) | NaOCH$_3$ (0.1) | 38 | 62 | 0 | — | 0.40 | 140 | 0.31 |
| Ex. 10 | | | (A-5) | | 16 | 82 | 2 | — | 0.40 | 133 | 0.38 |
| Ex. 11 | | | (A-6) | | 47 | 51 | 2 | — | 0.44 | 158 | 0.45 |
| Ex. 12 | | | (A-7) | | 20 | 70 | 3 | 7 | 0.42 | 136 | 0.45 |
| Ex. 13 | | | (A-4) | Li acetate (0.1) | 37 | 62 | 1 | — | 0.41 | 140 | 0.37 |
| Ex. 14 | | | (A-4) | Mg acetate (0.1) | 33 | 65 | 2 | — | 0.45 | 137 | 0.4 |
| Ex. 15 | | no | (A-4) | NaOCH$_3$ (0.1) | 38 | 62 | 0 | — | 0.40 | 140 | 0.44 |
| Ex. 16 | 28.0 | yes | (A-4) | NaOCH$_3$ (0.1) | 35 | 62 | 3 | — | 0.40 | 142 | 0.38 |
| Co. Ex. 2 | 44.5 | yes | (A-8) | — | 32 | 63 | 5 | — | 0.5 | 147 | 0.67 |
| Co. Ex. 3 | | | (A-9) | | 13 | 83 | 4 | — | 0.45 | 132 | 0.66 |
| Co. Ex. 4 | | | (A-10) | | 16 | 72 | 5 | 7 | 0.47 | 135 | 0.68 |
| Co. Ex. 5 | | | (A-11) | | 15 | 54 | 11 | 20 | 0.45 | 134 | 0.66 |
| Co. Ex. 6 | | | (A-8) | NaOCH$_3$ (0.1) | 38 | 62 | 0 | — | 0.5 | 140 | 0.65 |
| Co. Ex. 7 | | | (A-9) | | 16 | 82 | 2 | — | 0.44 | 133 | 0.68 |
| Co. Ex. 8 | | | (A-10) | | 20 | 70 | 3 | 7 | 0.47 | 136 | 0.63 |
| Co. Ex. 9 | | | (A-11) | | 18 | 55 | 6 | 21 | 0.46 | 132 | 0.68 |

TABLE 5

| | | Transparency | | | | | |
|---|---|---|---|---|---|---|---|
| | YI | Total light Transmittance (%) | Haze (%) | Optical Isotropy Birefringence (×10$^{-4}$) | Scratch Resistance Pencil Hardness | Dwell Stability ΔYI | Chemical Resistance Critical Strain (%) |
| Ex. 4 | 4.9 | 93 | 2.4 | 0.7 | 5H | 0.9 | 2.34 |
| Ex. 5 | 1.8 | 93 | 2.2 | 0.6 | 5H | 0.4 | 2.21 |
| Ex. 6 | 2.9 | 92 | 2.3 | 0.9 | 4H | 0.6 | 1.98 |
| Ex. 7 | 6.1 | 88 | 4.3 | 0.5 | 4H | 1.2 | 2.67 |

TABLE 5-continued

|  | YI | Transparency | | Optical Isotropy Birefringence (×10⁻⁴) | Scratch Resistance Pencil Hardness | Dwell Stability ΔYI | Chemical Resistance Critical Strain (%) |
|---|---|---|---|---|---|---|---|
|  |  | Total light Transmittance (%) | Haze (%) |  |  |  |  |
| Ex. 8 | 5.2 | 93 | 4.2 | 1.4 | 4H | 1.0 | 1.56 |
| Ex. 9 | 1.9 | 93 | 0.9 | 0.3 | 4H | 0.1 | 2.23 |
| Ex. 10 | 3.3 | 92 | 1.2 | 0.6 | 4H | 0.3 | 1.91 |
| Ex. 11 | 6.5 | 92 | 1.4 | 0.4 | 5H | 0.3 | 2.61 |
| Ex. 12 | 6.5 | 88 | 3.9 | 1.3 | 4H | 0.5 | 1.55 |
| Ex. 13 | 2.9 | 92 | 1.1 | 0.3 | 4H | 0.1 | 2.23 |
| Ex. 14 | 4.2 | 89 | 1.6 | 0.4 | 4H | 0.6 | 2.16 |
| Ex. 15 | 6.1 | 91 | 1.0 | 0.4 | 4H | 0.4 | 2.20 |
| Ex. 16 | 3.3 | 93 | 2.3 | 0.5 | 4H | 0.8 | 2.11 |
| Co. Ex. 2 | 16.6 | 90 | 5.5 | 0.7 | 5H | 9.2 | 2.08 |
| Co. Ex. 3 | 16.1 | 90 | 5.3 | 0.9 | 4H | 8.5 | 1.77 |
| Co. Ex. 4 | 17.0 | 87 | 6.3 | 1.5 | 4H | 9.1 | 1.44 |
| Co. Ex. 5 | 16.1 | 85 | 9.1 | 1.9 | 3H | 10.1 | 1.21 |
| Co. Ex. 6 | 15.6 | 90 | 3.1 | 0.4 | 4H | 6.1 | 2.09 |
| Co. Ex. 7 | 17.0 | 90 | 4.2 | 0.7 | 4H | 7.9 | 1.75 |
| Co. Ex. 8 | 14.7 | 86 | 6.2 | 1.3 | 3H | 6.6 | 1.41 |
| Co. Ex. 9 | 17.0 | 84 | 9.0 | 1.9 | 3H | 9.6 | 1.20 |
| Co. Ex. 10 (PMMA) | 1.9 | 93 | 1.0 | 1.2 | 3H | 0.1 | 1.01 |
| Co. Ex. 11 (PC) | 2.4 | 89 | 1.3 | 2.1 | 2B | 0.2 | 0.73 |

From Examples 4 to 14 and Comparative Examples 2 to 11, it is understood that the thermoplastic polymer having the specific absorbance characteristic defined in the invention can be obtained through polymerization at a controlled temperature not higher than 90° C., and, as a result, it can be a transparent material of good colorlessness with high-level heat resistance, optical isotropy and scratch resistance.

On the other hand, it is also understood that, when the monomers are copolymerized at a polymerization temperature not falling within the scope of the invention, then the polymers obtained in any other conditions could not attain the absorbance characteristic defined in the invention and their colorlessness is not good.

When Examples 4 to 8 are compared with Examples 9 to 14, it is understood that the intramolecular cyclization promoter added is effective for reducing the amount of the non-reacted unsaturated carboxylic acid that remains in the thermoplastic polymer (B) and therefore the dwell stability (thermal discoloration resistance) of the polymer obtained is especially good. When they are compared with Example 16, it is also understood that the extruder having a satisfactorily long L/D is effective for reducing the amount of the non-reacted unsaturated carboxylic acid that remains in the thermoplastic polymer and is therefore favorable in view of the dwell stability of the polymer.

When Example 9 is compared with Example 15, it is understood that nitrogen purging inside the extruder is effective for producing a colorless transparent material of higher discoloration resistance.

When compared with PMMA and PC, it is understood that the thermoplastic polymer of the invention has good heat resistance, colorless transparency and dwell stability, and has especially good optical isotropy, scratch resistance and chemical resistance.

[Example 17]

Using ethylene glycol monoethyl ether for a polymerization solvent, a mixture of the following substances was prepared. The mixture was fed into a 2-liter, full-mixing polymerization reactor at the rate of 1 liter/h, and polymerized at a temperature of 90° C. for 120 minutes.

| Methacrylic acid | 37 parts by weight |
|---|---|
| Methyl methacrylate | 43 parts by weight |
| Styrene | 20 parts by weight |
| Ethylene glycol monoethyl ether | 55 parts by weight |
| N-octylmercaptan | 0.15 parts by weight |
| 1,1-Di-tert-butylperoxycyclohexane | 0.01 parts by weight |
| 1,1,3-tris(2-methyl-4-ditridecylphosphite-5-t-butylphenyl) butane | 0.05 parts by weight |

In this case, the polymer solution could have a solid content of 50% by weight. This was fed into a vacuum evaporator at 260° C. under 20 Torr, and kept therein for 30 minutes. Then, this was taken out to obtain a thermoplastic polymer having glutaric anhydride units. Thus obtained, the thermoplastic polymer was analyzed with an IR spectrophotometer, and it gave an absorption peak at 1800 cm⁻¹ and 1760 cm⁻¹. This confirms that the thermoplastic polymer had glutaric anhydride units formed therein. The intrinsic viscosity of the thermoplastic polymer was 0.48 dl/g.

[Comparative Example 12]

A thermoplastic polymer was obtained in the same manner as in Example 17 except that the polymerization temperature was changed to 111° C. Thus obtained, the thermoplastic polymer was analyzed with an IR spectrophotometer, and it gave an absorption peak at 1800 cm⁻¹ and 1760 cm⁻¹. This confirms that the thermoplastic polymer had glutaric anhydride units formed therein.

The data of the physical properties of the polymers of Example 17 and Comparative Example 12 are given in Table 6.

TABLE 6

| | Copolymerization Composition (wt. %) of Thermoplastic Polymer (B) | | | | Intrinsic Viscosity (dl/g) | Tg (° C.) | Absorbance at 280 nm | YI | Dwell Stability ΔYI |
|---|---|---|---|---|---|---|---|---|---|
| | (i) GAH | (ii) MMA | (iii) MAA | (iv) St | | | | | |
| Example 17 | 36 | 30 | 8 | 26 | 0.48 | 150 | 0.41 | 4.2 | 1.3 |
| Comparative Example 12 | 36 | 30 | 8 | 26 | 0.49 | 149 | 0.64 | 11.5 | 14.5 |

From the results of Example 17 and Comparative Example 12, it is understood that, when the monomers are polymerized in a mode of solution polymerization at a temperature not higher than 90° C., then a thermoplastic polymer of good colorless transparency and high-level heat resistance, especially of good dwell stability can be obtained.

[Example 18]

Figure 2:
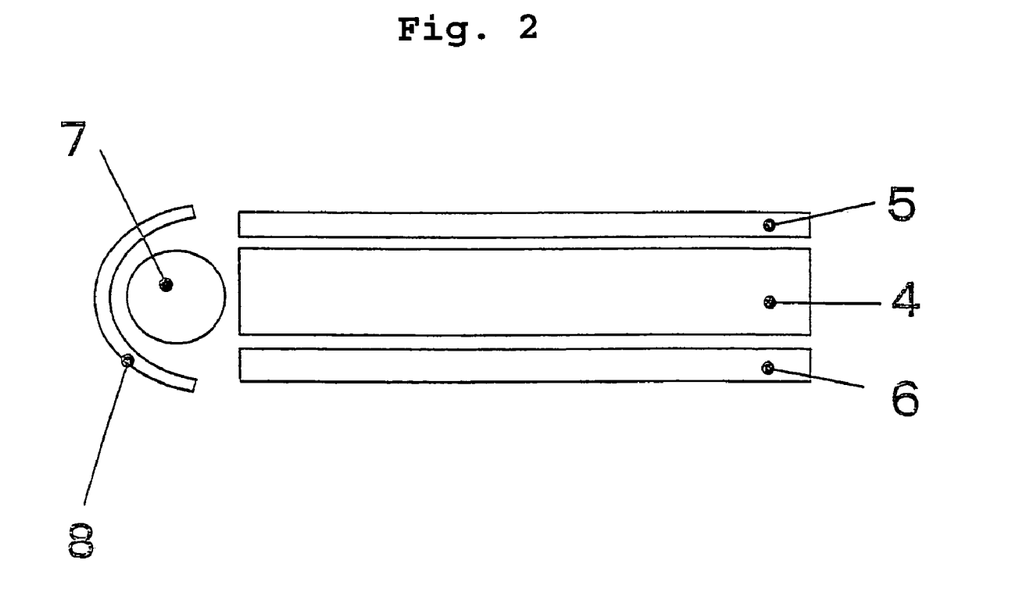
FIG. 2 is a schematic cross-sectional view of the optical waveguide produced in Example 18.

The thermoplastic polymer of Example 9 was injection-molded to form a tabular molding having a size of 200 mm×120 mm×3 mm. FIG. 2 is a schematic cross-sectional view of an optical waveguide tester, which was fabricated by putting the tabular molding 4 between a diffusion sheet 5 and a reflection sheet 6. A light source 7 and a reflector 8 were fitted to it, and the tabular molding 4 therein was tested for optical conductivity. As a result, it was found that the tabular molding in this Example has good transparency and optical conductivity, and is therefore useful as an optical waveguide.

[Example 19]

Figure 3:
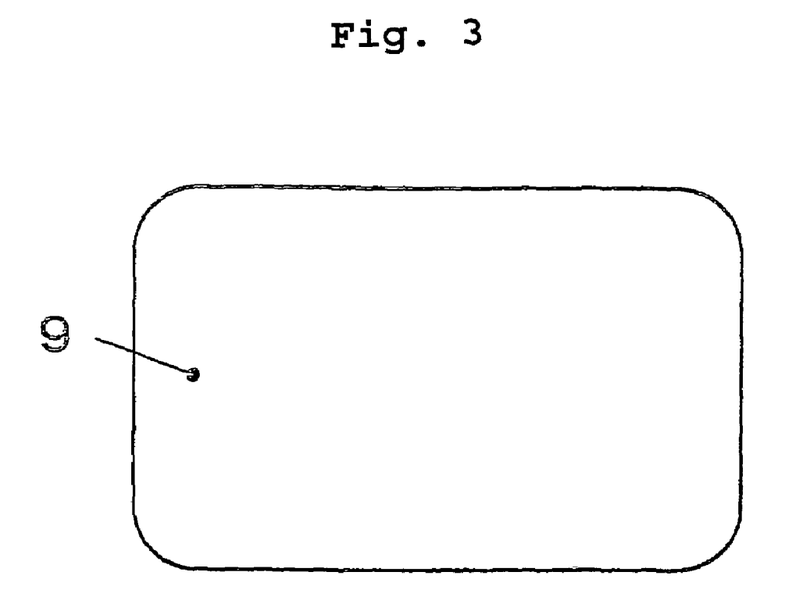
FIG. 3 is a front view of the transparent member for automobile lamps, produced in Example 19.
Figure 4:
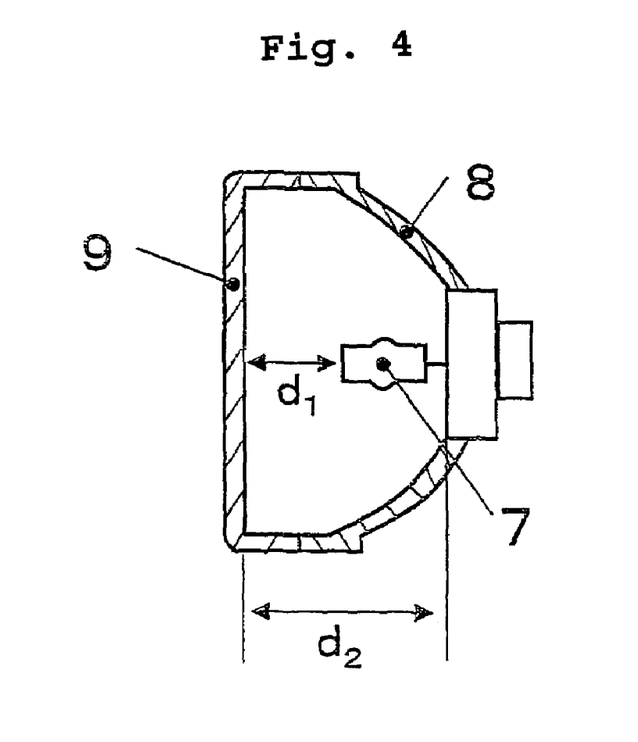
FIG. 4 is a cross-sectional side view of the automobile lamp produced in Example 19.

A transparent member 9 for automobile lamps was formed through injection-molding of the thermoplastic polymer of Example 9, as in FIG. 3 and FIG. 4. The size of the transparent member 9 is as follows: The height is 150 mm, the width is 250 mm, the depth is 10 mm, and the mean wall thickness is 3 mm. For the light source 7, used was a xenon HID lamp of 12 V/35 W. The distance from the light source to the transparent member, $d_1$=70 mm; and the lamp depth, $d_2$=100 mm. This was combined with a reflector 8 to construct an automobile lamp of FIG. 4. FIG. 3 is a front view of the transparent parts for automobile lamps; and FIG. 4 is a cross-sectional side view of the automobile lamp with the transparent parts fitted therein. The automobile lamp comprises the reflector 8 and the HID light source 7 combined with the transparent parts 9. This lamp was kept lighting at an ambient temperature of 60° C. for 12 hours, and, as a result, the transparent parts 9 underwent no change of deformation, transparency reduction or yellowing. This confirms the usefulness of the polymer for lighters for vehicles.

[Example 20]

Using an injection molding machine (Meiki Seisakusho's M-50AII-SJ), pellets of the thermoplastic polymer of Example 9 were injection-molded to give colorless transparent concave lenses having a diameter of 40 mm, an edge thickness of 3 mm and a center thickness of 1.6 mm. The molding temperature was 290° C., the mold temperature was 100° C., the injection time was 10 seconds, the cooling time was 30 seconds, and the injection pressure was 10 MPa. Thus obtained, the lens was coated with a silica-type hard coating agent (Shin-etsu Chemical's KP-851) and cured at 120° C. for 1 hour to be an eyeglass. The eyeglass had good heat resistance and thermal stability, and did not deform even when treated for hard coating at such a relatively high temperature (120° C.). Its total light transmittance was 92%, and its transparency was good. Further, the eyeglass was tested for cross-cut peeling resistance (concretely, the hard-coated surface of the lens was cut with a knife to have 11 parallel lines thereon both vertically and horizontally at intervals of 1 mm, therefore having 100 cross-cuts in all; and an adhesive cellophane tape was stuck to the cross-cut surface, and this was peeled). As a result, no cross-cut peeled off. This confirms that the lens formed of the thermoplastic polymer of the invention is firmly coated with a hard coating agent and is therefore favorable for eyeglasses.

The invention claimed is:

1. A thermoplastic polymer containing (i) from 25 to 50% by weight of glutaric anhydride units of the following general formula (1) and having an absorbance at a wavelength of 280 nm of at most 0.5 measured on a film having a thickness of 100 μm with a UV-visible spectrophotometer:

(1)

wherein $R^1$ and $R^2$ are the same or different and each represents a hydrogen atom or an alkyl group having from 1 to 5 carbon atoms; and wherein said polymer is obtained at a polymerization temperature of not more than 90° C.

2. The thermoplastic polymer as claimed in claim 1, which is a copolymer further containing (ii) from 50 to 75% by weight of unsaturated carboxylic acid alkyl ester units.

3. The thermoplastic polymer as claimed in claim 2, which is a copolymer having the above-mentioned units (i) and (ii), and further (iii) at most 10% by weight of unsaturated carboxylic acid units and/or (iv) at most 10% by weight of other vinyl monomer units.

4. The thermoplastic polymer as claimed in claim 3, wherein the unsaturated carboxylic acid units (iii) have a structure of the following general formula (2):

(2)

wherein $R^3$ represents a hydrogen atom or an alkyl group having from 1 to 5 carbon atoms.

5. The thermoplastic polymer as claimed in claim 2, wherein the unsaturated carboxylic acid alkyl ester units (ii) have a structure of the following general formula (3):

(3)

wherein $R^4$ represents a hydrogen atom or an alkyl group having from 1 to 5 carbon atoms; and $R^5$ represents an aliphatic or alicyclic hydrocarbon group having from 1 to 6 carbon atoms, or an aliphatic or alicyclic hydrocarbon group having from 1 to 6 carbon atoms and substituted with one or more, not exceeding the number of its carbon atoms, of hydroxyl groups or halogen atoms.

6. The thermoplastic polymer as claimed in claim 1, of which the yellowness index is at most 5.

7. The thermoplastic polymer as claimed in claim 1, of which the absolute value of the birefringence is at most $1.0 \times 10^{-4}$.

8. The thermoplastic polymer as claimed in claim 1, of which the pencil hardness is not lower than 4H.

9. A molding of the thermoplastic polymer of claim 1.

10. An optical material for light transmission, which comprises the thermoplastic polymer of claim 1.

11. A transparent parts for vehicle lighters, which comprises the thermoplastic polymer of claim 1.

12. The thermoplastic polymer as claimed in claim 1, wherein a glass transition temperature is not lower than 130° C.

* * * * *